(12) United States Patent
Twumasi-Boakye et al.

(10) Patent No.: US 11,915,172 B2
(45) Date of Patent: Feb. 27, 2024

(54) ROBOT-ASSISTED PACKAGE DELIVERY WITH INTEGRATED CURBSIDE PARKING MONITORING AND CURB OPERATIONS OPTIMIZATION

(71) Applicant: Ford Global Technologies, LLC, Dearborn, MI (US)

(72) Inventors: Richard Twumasi-Boakye, Taylor, MI (US); Mohammed Fayaj navaz, Dearborn, MI (US); Eric Wingfield, Ann Arbor, MI (US); Archak Mittal, Canton, MI (US); Xiaolin Cai, Ann Arbor, MI (US); James Fishelson, Ypsilanti, MI (US); Andrea Broaddus, Berkeley, CA (US); Jon Coleman, Saline, MI (US); Amit Bhagwan, Dearborn, MI (US); Dhanush Harihar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 17/152,092

(22) Filed: Jan. 19, 2021

(65) Prior Publication Data
US 2022/0230109 A1 Jul. 21, 2022

(51) Int. Cl.
*G06Q 10/06* (2023.01)
*G06Q 10/0631* (2023.01)
*G06N 20/00* (2019.01)
*G07C 5/00* (2006.01)
(Continued)

(52) U.S. Cl.
CPC ..... *G06Q 10/06313* (2013.01); *G05D 1/0214* (2013.01); *G06N 20/00* (2019.01);
(Continued)

(58) Field of Classification Search
CPC .. G06Q 10/06; G06Q 20/00; G06Q 10/06313; G06Q 10/0833;
(Continued)

(56) References Cited

U.S. PATENT DOCUMENTS 10,134,290 B2 * 11/2018 Mikan .................. G08G 5/0034
10,351,060 B2 * 7/2019 Ha ............................ B60R 1/00
(Continued)

FOREIGN PATENT DOCUMENTS

WO WO 2017/079587 A1 * 5/2017 ............. G06Q 10/08

Primary Examiner — Andrew Joseph Rudy
(74) Attorney, Agent, or Firm — Brandon Hicks; Eversheds Sutherland (US) LLP

(57) ABSTRACT

Robot-assisted package delivery with integrated curbside parking monitoring and curb operations optimization is disclosed herein. An example method includes dispatching a delivery vehicle and delivery robot to a delivery location, the delivery location including a parking location for the delivery vehicle that allows for deployment of the delivery robot on a delivery mission, determining occupancy of the parking location, the delivery vehicle parking at the parking location when the parking location is unoccupied, the delivery robot being deployed upon parking of the delivery vehicle, and instructing the delivery vehicle to remain parked during the delivery mission or to leave the parking location and return at later point in time based on an estimated time of arrival of the delivery robot after the delivery mission.

18 Claims, 6 Drawing Sheets

(51) Int. Cl.
  *G06Q 10/0833*     (2023.01)
  *G06Q 10/02*       (2012.01)
  *G05D 1/00*        (2006.01)
  *H04L 67/12*       (2022.01)
  *G06Q 10/0639*     (2023.01)
  *G06Q 50/26*       (2012.01)
  *B60P 3/00*        (2006.01)

(52) U.S. Cl.
  CPC ....... *G06Q 10/02* (2013.01); *G06Q 10/06312* (2013.01); *G06Q 10/0833* (2013.01); *G07C 5/008* (2013.01); *B60P 3/007* (2013.01); *G06Q 10/06393* (2013.01); *G06Q 50/26* (2013.01); *H04L 67/12* (2013.01)

(58) Field of Classification Search
  CPC .. G06Q 10/06312; G06Q 10/02; G06Q 50/26; G06N 20/00; G07C 5/008; G05D 1/0214
  See application file for complete search history.

(56) References Cited

U.S. PATENT DOCUMENTS

| | | | |
|---|---|---|---|
| 10,890,921 B2* | 1/2021 | Gillett | G05D 1/0088 |
| 11,288,622 B2* | 3/2022 | Banvait | B64C 39/024 |
| 11,643,070 B2* | 5/2023 | Wang | B62D 15/0285 |
| | | | 701/25 |
| 2019/0004539 A1* | 1/2019 | Yu | B60P 3/007 |
| 2019/0035282 A1* | 1/2019 | Ferguson | G06Q 10/0837 |
| 2020/0311846 A1* | 10/2020 | Chen | G08G 1/202 |
| 2020/0410623 A1* | 12/2020 | Vahabzadeh | G07B 15/02 |

* cited by examiner

ROBOT-ASSISTED PACKAGE DELIVERY WITH INTEGRATED CURBSIDE PARKING MONITORING AND CURB OPERATIONS OPTIMIZATION

BACKGROUND

Cities are struggling with curb space management in urban areas. Delivery vehicles compound this issue due to their proclivity to use parking spaces. For example, delivery vehicle curbside use may create long parking durations at curbside parking locations. Traditional policies for allocating curb real-estate are sub-optimized as a result of curb usage for goods and services delivery.

There is high variability in goods delivery times at drop off locations in urban areas. Different goods require different delivery times and lengths of delivery, taking curb space from other uses. Additionally, vertical dimensions of buildings compound the pressure on a set curb length in front of a high-rise. For example, delivering a package on the seventh floor in a downtown location may take much longer than delivering a package in a single-story residential location. Moreover, there are more people/businesses placing orders in these locales. Thus, in downtown areas that experience parking issues, curbside parking may be occupied by delivery vehicles for longer durations.

The "Final 50 Feet" of urban goods delivery involves a supply chain segment which starts where trucks load/unload goods at a curb or alley and tracks the delivery process inside buildings or the city's vertical space. These new capabilities are not coordinated with the robot/vehicle allocation of goods and services.

Curb space management is a pain point for most urban cities. In downtown areas, especially, the pickup and delivery of goods are almost exclusively done at curbside, and thus, magnifying the needs above and creating competition that goods and services vehicles have for curb space with other curb space users.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
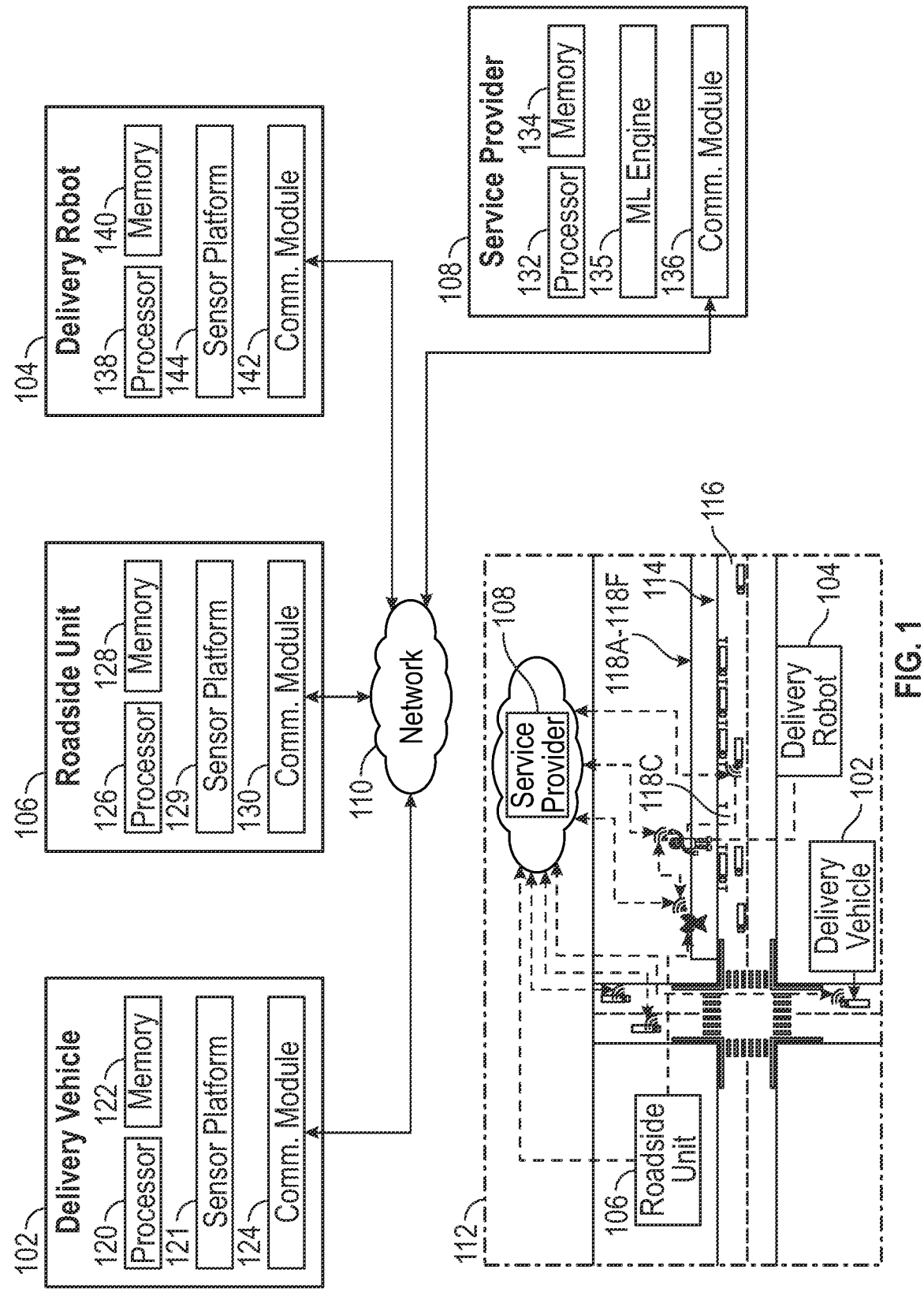
FIG. 1 depicts an illustrative architecture in which techniques and structures for providing the systems and methods disclosed herein may be implemented.

The present disclosure is generally directed to robot-assisted package delivery with integrated curbside parking monitoring and curb-use optimization. The systems and methods provide an intelligent system using the "Final 50 Feet" and better curb allocation to support the urban goods delivery process (pickup/load, unload/drop-off) to minimize the competition for curb space.

The systems and methods disclosed herein utilize delivery robots to support goods delivery in urban areas to free up curbside parking. Real-time and predictive analyses can be used to optimally determine robot(s) drop-off and pick-up location. This can be based on robot delivery address(es) and available curb or lot parking, in some instances.

The systems and methods can include leveraging real-time parking information from smart parking systems, including parking space reservations, to determine the next best parking location for drop-off/pick-up. The systems and methods can also be to communicate the use of a parking space or reservation to enable smart parking systems (generally referred to a roadside infrastructure) to improve demand and use the estimation of the curb for city and parking authorities. Integrating the above data into visualization platforms (e.g. Ford's City Insights Studio platform) and building prototype curbside and traffic simulation models (CTSM) for decision making and testing future use cases.

Broadly, the present disclosure pertains to robot-assisted delivery systems that allow for location, time, and condition communication between a delivery robot and a driver. Through this system, real-time and predictive curb availability with optimized recommendations can be provided to the service delivery vehicle (that includes the delivery robots). The delivery vehicle may drop-off delivery robot(s) with an assigned package and leave for other delivery assignments (for example, at locations where the delivery time for the delivery robot is estimated to exceed a predetermined time threshold). A parking decision by delivery vehicle may be determined by the driver and/or vehicle's awareness (automated vehicle) of parking utilization within a geofenced area (delivery zone) through near real-time monitoring and/or machine learning based on prior parking utilization. Information about curbside conditions may be shared between, for example, cloud systems, roadside units, vehicles in the area, robots, and so forth. Example systems or logic as disclosed herein may be integrated into a visualization platform for near real-time monitoring of curbside parking utilization, delivery robot state and utilization, and interaction between delivery mechanism and traffic patterns—just to name a few. In some instances, upon completion of the delivery assignment, a delivery robot can signal the delivery vehicle/driver (or AV) and/or other available delivery vehicles/drivers for pickup and/or cloud for dispatch instructions.

Safety features can be implemented such as an alarm trigger for the delivery robot. For example, when someone tries to tamper with the robot or during robot malfunctioning (trigger the shutdown of the robot). During a severe breach during the delivery errand, an exception alert alarm can be triggered by the robot to a dispatcher and/or other delivery vehicles for emergency team attention.

These systems can be integrated into the visualization platform for near real-time monitoring of curbside parking utilization, delivery robot state, and utilization, and interaction between delivery mechanism and traffic patterns The data from this system can be leveraged for building prototype CTSMs for testing future strategies for improving curbside parking utilization, including but not limited to robot-assisted delivery. These CTSMs may be integrated into visualization platforms for city planners and engineers to discuss new designs and policies for curbside management.

Illustrative Embodiments

Turning now to the drawings, FIG. 1 depicts an illustrative architecture 100 in which techniques and structures of the present disclosure may be implemented. The architecture 100 can include a delivery vehicle 102, a delivery robot 104, a roadside infrastructure unit 106, and a service provider 108. Each of these components in the architecture 100 can communicate using a network 110. The network 110 can include combinations of networks that enable the components in the architecture 100 to communicate with one another. The network 110 may include any one or a combination of multiple different types of networks, such as cable networks, the Internet, wireless networks, and other private and/or public networks. In some instances, the network 110 may include cellular, Wi-Fi, or Wi-Fi direct.

The architecture 100 can include additional delivery vehicles, roadside infrastructure units, and/or robot units, as well as other legacy vehicles that may operate within an operating area 112. The operating area 112 can include a curb space 114 that extends along a street 116. The curb space 114 could extend along and in front of a commercial space such as a building or other urban location (not shown). The curb space 114 can be subdivided into slots 118A-118F. The curb space 114 is an example parking location and the location where the delivery robot is deployed is generally referred to as a delivery location.

It will be understood that the operating area 112 illustrated in FIG. 1 is provided for illustrative and descriptive purposes and is not intended to be limiting. Generally, the slots are referred to as a parking location. A parking location can either be occupied or unoccupied, and the occupancy can be based on actual occupancy or determined through a reservation system (in the instance where parking locations can be reserved in advance of their use).

For context, the delivery vehicle 102 has previously dropped off the robot unit 104 to deliver a package to a recipient (not shown). After package delivery, the delivery vehicle 102 can coordinate with the robot unit 104 to identify a portion of the curb space 114, such as one of the slots 118A-118F that is currently unoccupied. The delivery vehicle 102 can navigate to an unoccupied slot, such as slot 118C based on data obtained from any of the delivery vehicle 102, the robot unit 104, and/or the roadside infrastructure unit 106. The determination as to which slot to occupy can be based on data from any or all of these elements in the architecture 100.

The delivery vehicle 102 can include a processor 120 and memory 122. The memory 122 stores instructions that can be executed by the processor 120 to perform operations in accordance with the present disclosure, such as curbside occupancy monitoring, and picking and drop/off of the delivery robot 104. The delivery vehicle 102 includes a communications module 124 that allows the processor 120 to transmit and/or receive data over the network 110. The delivery vehicle 102 can include a vehicle sensor platform 121 that includes objects such as cameras, proximity sensors, or other components that can be used to determine whether a parking location is currently occupied or unoccupied.

The roadside infrastructure unit 106 can include a processor 126 and memory 128. The memory 128 stores instructions that can be executed by the processor 126 to perform operations in accordance with the present disclosure, such as curbside occupancy monitoring, as well as package delivery and pickup requests. The roadside infrastructure unit 106 can include a sensor platform 129 that includes objects such as cameras, proximity sensors, or other components that can be used to determine whether a parking location is currently occupied or unoccupied. The roadside infrastructure unit 106 includes a communications module 130 that allows the processor 126 to transmit and/or receive data over the network 110.

The service provider 108 can include a processor 132 and memory 134. The memory 134 stores instructions that can be executed by the processor 132 to perform operations in accordance with the present disclosure, such as curbside occupancy monitoring, as well as delivery vehicle dispatch and robot delivery service management. The service provider 108 includes a machine learning engine 135, the details of which will be discussed in greater detail herein (an example with respect to FIG. 4), and a communications module 136 that allows the processor 132 to transmit and/or receive data over the network 110.

The delivery robot 104 can include a processor 138 and memory 140. The memory 140 stores instructions that can be executed by the processor 138 to perform operations in accordance with the present disclosure, such as package delivery, safety status determination, and curbside occupancy monitoring. The delivery robot 104 includes a communications module 142 that allows the processor 138 to transmit and/or receive data over the network 110. The delivery robot 104 can include a robot sensor platform 144 that includes objects such as cameras, location sensors (such as GPS), proximity sensors, gyroscopes, accelerometers, and/or other components that allow the delivery robot 104 to navigate itself and deliver packages to recipients. The robot sensor platform 144 can comprise a radio-frequency identifier (RFID) transceiver with a beam-steerable phased-array antenna that transmits data that can be used by the service provider 108 and/or the delivery vehicle 102 to track and identify the delivery robot 104.

Data obtained from the robot sensor platform 144 can also be used to determine a safety status of the delivery robot 104, such as whether it is being tampered with or not. Data obtained from the robot sensor platform 144 can also be used to determine parking location occupancy (for example a camera feed can be evaluated to determine if a parking location is available), as well as other operations disclosed herein.

Figure 2:
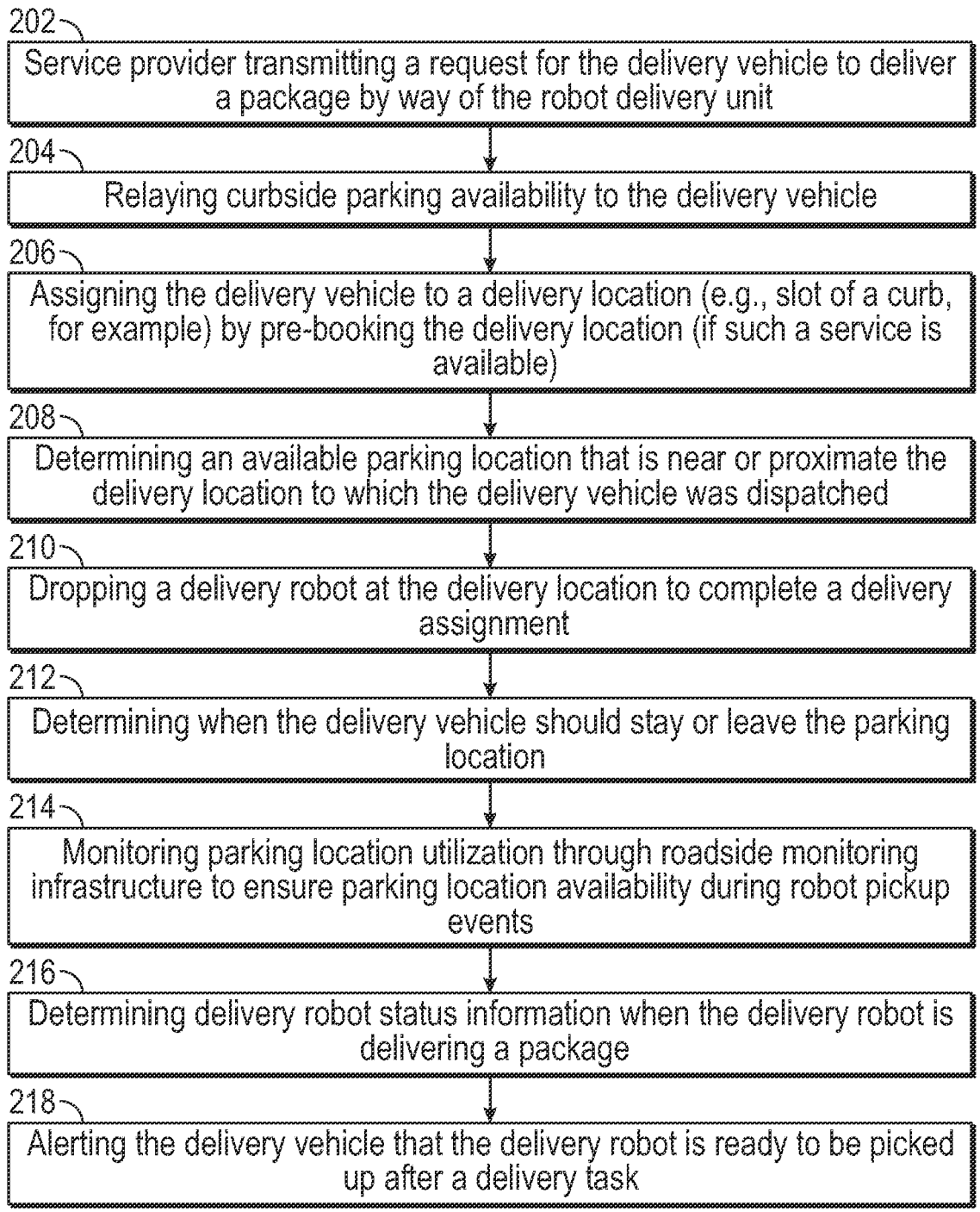
FIG. 2 is a flowchart of an example method of the present disclosure.

FIG. 2 illustrates an example flowchart that encompasses various aspects of robot delivery and curbside management. The method can broadly include a process of dispatching of a delivery vehicle. The delivery vehicle may be used to deliver a robot delivery unit that delivers a package or other goods to a recipient. The method can include a step 202 of a service provider transmitting a request for the delivery vehicle to deliver a package by way of the robot delivery unit. For example, the service provider can identify a recipient address for a package that is to be delivered by a robot delivery unit that is transported to a general area by the delivery vehicle. That is, the robot delivery unit acts as a device to perform a 'Final 50 Feet' delivery of a package, by example.

The method can include a step 204 of relaying curbside parking availability to the delivery vehicle. The curbside parking availability can be relayed in real-time, or near-real-time. The method can include a step 206 of assigning the delivery vehicle to a delivery location (e.g., slot of a curb, for example) by pre-booking the delivery location (if such a service is available). Alternatives to pre-booking can include the use of prediction-based analyses and/or use of historical parking location data.

Another aspect of the method involves the detection of a curbside parking spot at the delivery location. The method can include a step 208 of determining an available parking location that is near or proximate the delivery location to which the delivery vehicle was dispatched. The delivery vehicle can then park at the parking location. As noted above, the parking location can include a curbside slot, a parking spot in a parking lot or garage, or other similar vehicle parking location. The determination of the available parking location can be based on data obtained from a driver of the vehicle or a vehicle sensor platform when the vehicle is autonomous. As noted above, information regarding the occupancy state of a parking location can be determined from infrastructure systems as well.

In some instances, if a parking location is unavailable at the delivery location, the delivery vehicle can choose to circle the delivery location until the delivery location is free (assuming that this does not deleteriously impact a delivery schedule). The delivery vehicle can also choose to double-park an occupied parking location if the drop off of the robot is likely to be quick. This determination can be made relative to thresholds. For example, if it takes less than one minute to deploy the delivery robot, the delivery vehicle may choose to double-park.

The method can include a step 210 of dropping a delivery robot at the delivery location to complete a delivery assignment. The method can include a step 212 of determining when the delivery vehicle should stay or leave the parking location. This determination can be based, for example, on estimated delivery time for the delivery robot. For example, if the estimated delivery time is less than a threshold period of time, the delivery vehicle may wait for the delivery robot without the delivery vehicle leaving the parking location. In one example, the threshold period of time is five minutes, but this period of time can be selected as desired.

If the estimated delivery time is greater than the threshold period of time, the delivery vehicle may opt to leave the parking location and return at a later point in time. The parking location is used essentially as a drop off location for leaving the delivery robot to perform its delivery. The delivery vehicle leaves the parking location to allow other vehicles to utilize the parking location during the period of time that is required for the delivery robot to deliver its package. The delivery vehicle can return at a later point in time to the parking location or a different parking location to retrieve the delivery robot.

During pickup of the delivery robot, the method can include a step 214 of monitoring parking location utilization through roadside monitoring infrastructure to ensure parking location availability during robot pickup events. In the absence of a roadside monitoring infrastructure, historic data on parking location utilization can be coupled with current parking location availability during robot drop-off or pickup to improve future predictions and modeling.

The method can include a step 216 of determining delivery robot status information when the delivery robot is delivering a package. This can include the delivery robot determining delivery robot position, safety status, delivery completion time(s) (actual or estimated), and the like. These data can be relayed over a network to a service provider and/or the delivery vehicle.

The method can include a step 218 of alerting the delivery vehicle that the delivery robot is ready to be picked up after a delivery task. The alert can be received by the delivery vehicle directly from the delivery robot or through the service provider, which functions as a dispatcher. In some instances, a different delivery vehicle can be dispatched to pick up the delivery robot if coordination with the delivery vehicle that dropped off the delivery robot is impaired or unavailable. The alert can be based on the delivery robot status information, such as an estimated time of completion of a delivery task.

Aspects of the method can also generally include the creation of a visualization platform for real-time monitoring of the parking location. The parking location can be established as a geofenced area and monitoring parameters can be established. The monitoring parameters can involve not only parking location occupancy but also traffic flow and/or KPIs (key performance indicators) that are relevant to (and selected by) a user of the visualization platform. The data that is obtained for the visualization platform can be used to generate CTSM for cities to use in designing infrastructure and improving curbside and/or other parking or loading location utilization.

Data used to generate interfaces for the visualization platform can include, but are not limited to, near real-time parking location data (e.g., real-time occupancy), historic parking data, delivery robot state/status, robot ETA on a delivery mission, real-time traffic condition for delivery vehicle routing, smart parking assets (e.g., roadside infrastructure), dispatcher sending delivery missions, delivery locations, and schedules—just to name a few.

Figure 3:
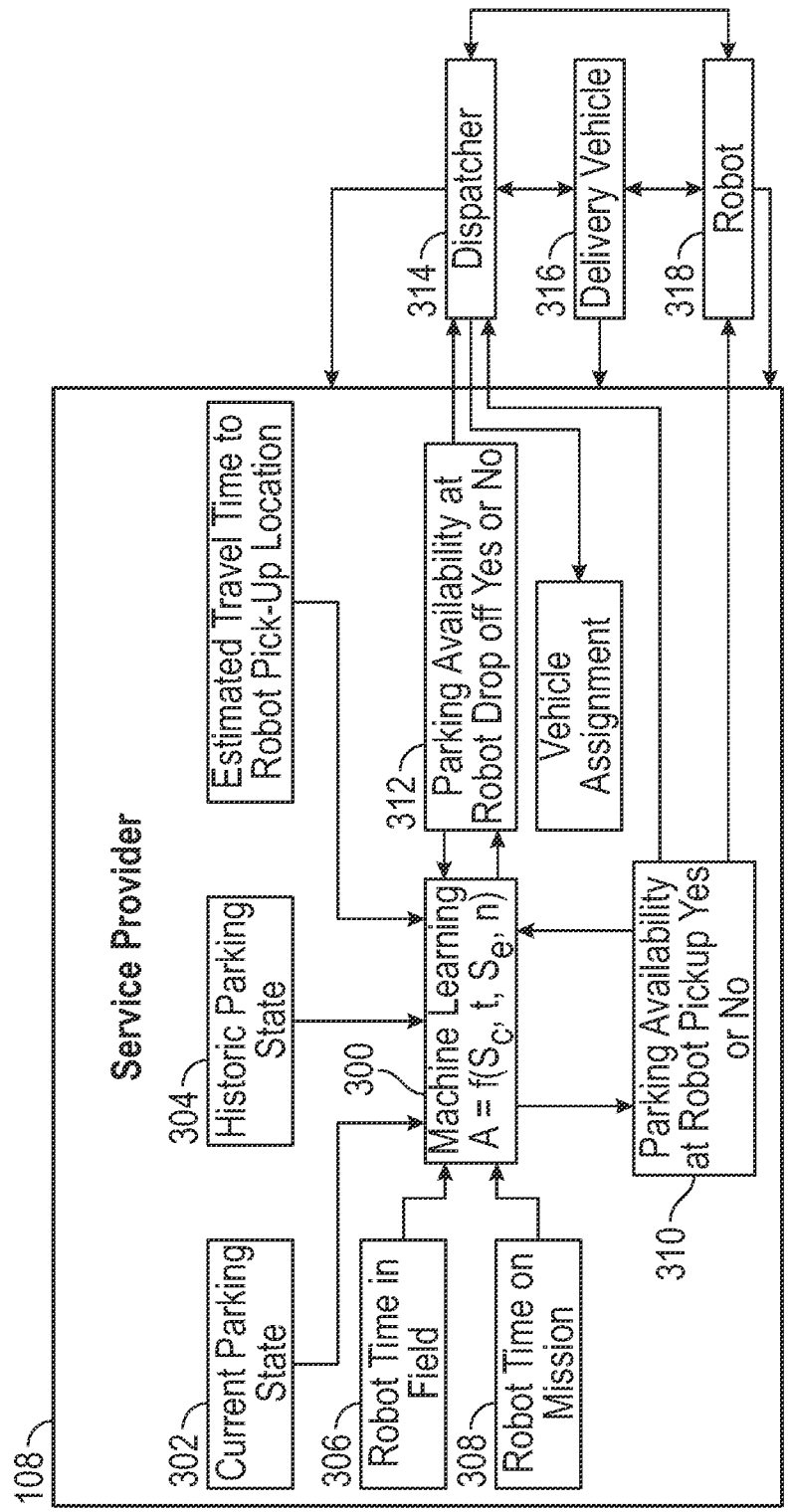
FIG. 3 is a schematic view of a service provider having a machine learning engine.

FIG. 3 is a schematic diagram of an example machine learning engine implemented at the service provider level. The machine learning engine 300 receives input data such as a current parking state 302, historic parking state(s) 304, robot time in field 306, and robot time on the mission (delivery event) 308. The machine learning engine 300 can determine parking availability for a delivery robot pickup event 310 as well as parking availability for a delivery robot drop-off event 312. A dispatcher 314 can dispatch a delivery vehicle 316 to drop off or pick up a delivery robot 318 based on information obtained from the machine learning engine 300 (such as from processes 310 and 312). The dispatcher 314, delivery vehicle 316, and delivery robot 318 can all communicate with one another over a network (not shown but see FIG. 1 for an example).

A parking decision can be determined by the machine learning engine 300 based on various conditions. For example, each time a delivery vehicle drops off a delivery robot, the delivery vehicle needs to decide whether to leave or remain at the parking spot in the event that curbside spots may be full during pickup. Once the delivery task is completed the delivery robot is picked up by the same delivery vehicle or other delivery vehicle from a fleet of delivery vehicles in the geofenced area.

Parameters used to make the decision include but are not limited to a current number of spaces available ($S_c$), estimated time needed to complete a delivery and return to the parking location ($t$), estimated number of spaces available at pickup time with historical data average ($S_e$), and a facility/ roadway type (n). Initial datasets can be obtained from roadside infrastructure units, where available. Alternatively, initial datasets can be generated during robot drop-off by ensuring that the delivery vehicle may begin with leaving the parking space each time, and observe whether there is an available spot, record as a binary value A (1 for available, 0 for not available).

A similar dataset can be obtained for robot pickup for the machine learning engine 300. The machine learning engine 300 may train a model based on the data collected such that A=f(Sc, t, Se, n). Various training models such as Neuron network can be used to train the model depending on the dataset. The model can be tested and validated for its accuracy (or weighted accuracy, as for certain locations, wrong predictions may be more critical than others depending on the use case). After the initial dataset is collected and the model is trained by the machine learning engine 300, the dispatcher 314 can communicate a parking decision to the delivery vehicle 316 based on the model prediction and continue to collect data to further improve the model over time with additional data.

Figure 4:
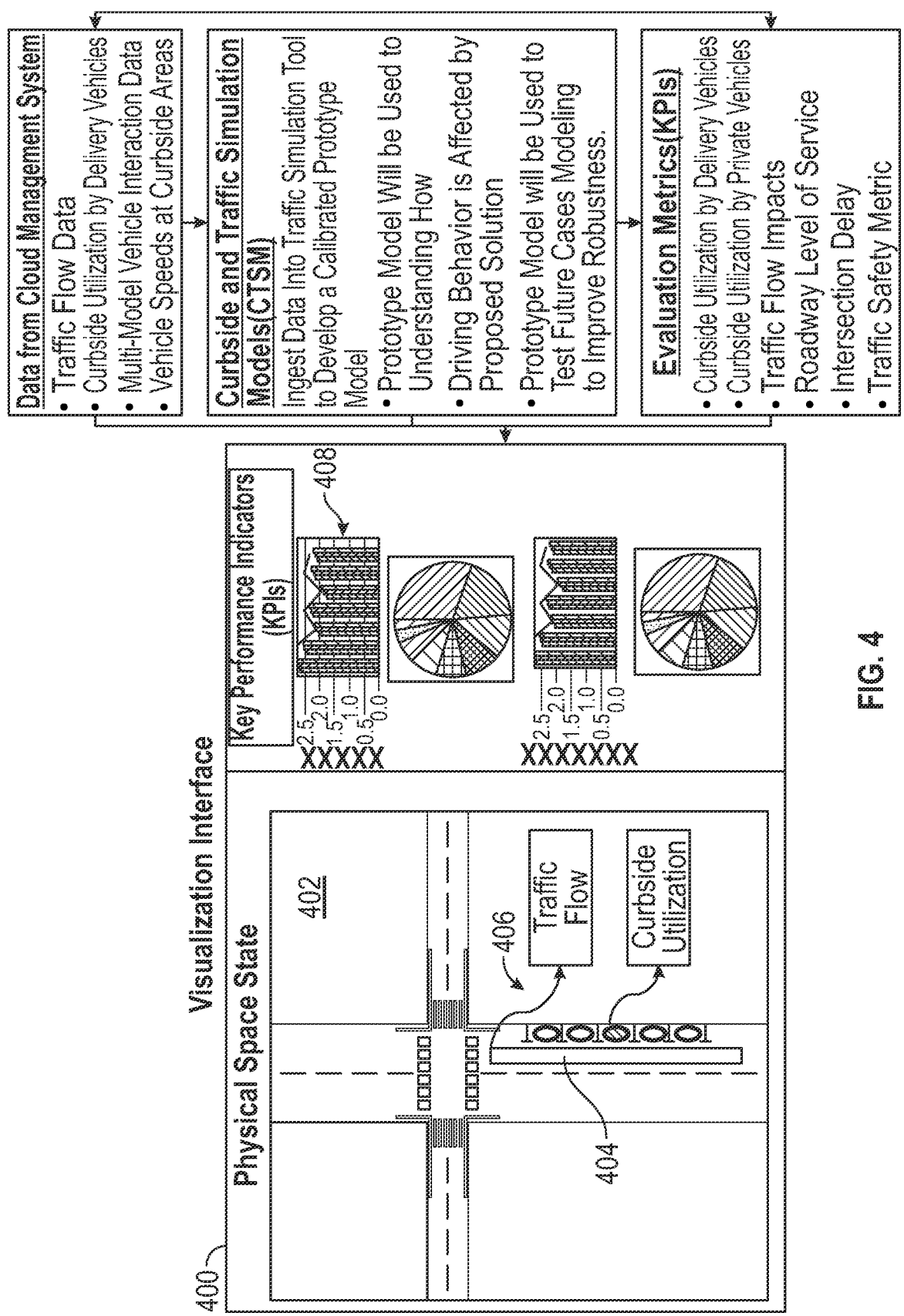
FIG. 4 is an example visualization interface of the present disclosure.

FIG. 4 illustrates an example visualization interface 400. The visualization interface 400 can model an operating area 402, as well as traffic flow 404 and utilization of a parking location 406. The visualization interface 400 can include graphical representations 408 of KPIs that can be user-selected. The KPIs can be predicated upon data (real-time and/or historic) collected from a service provider that can include, but are not limited to, traffic flow data, curbside utilization by delivery vehicles, multi-modal vehicle interaction data, vehicle speeds at curbside areas, and the like. These data can be utilized to create a CTSM. That is, a machine learning engine (such as the engine 300 of FIG. 3), can ingest the data into a traffic simulation tool to develop a calibrated prototype model. The model can be used to understand how driving behaviors are affected by a proposed solution. The model can also be used to test future case modeling to improve delivery vehicle and robot dispatch, drop-off, and pick-up solutions. Example KPIs of interest can be derived from models such as curbside utilization by delivery vehicle(s), curbside utilization by private vehicle(s), traffic flow impacts, roadway level of service, intersection delays, and traffic safety metrics—just to name a few.

Figure 5:
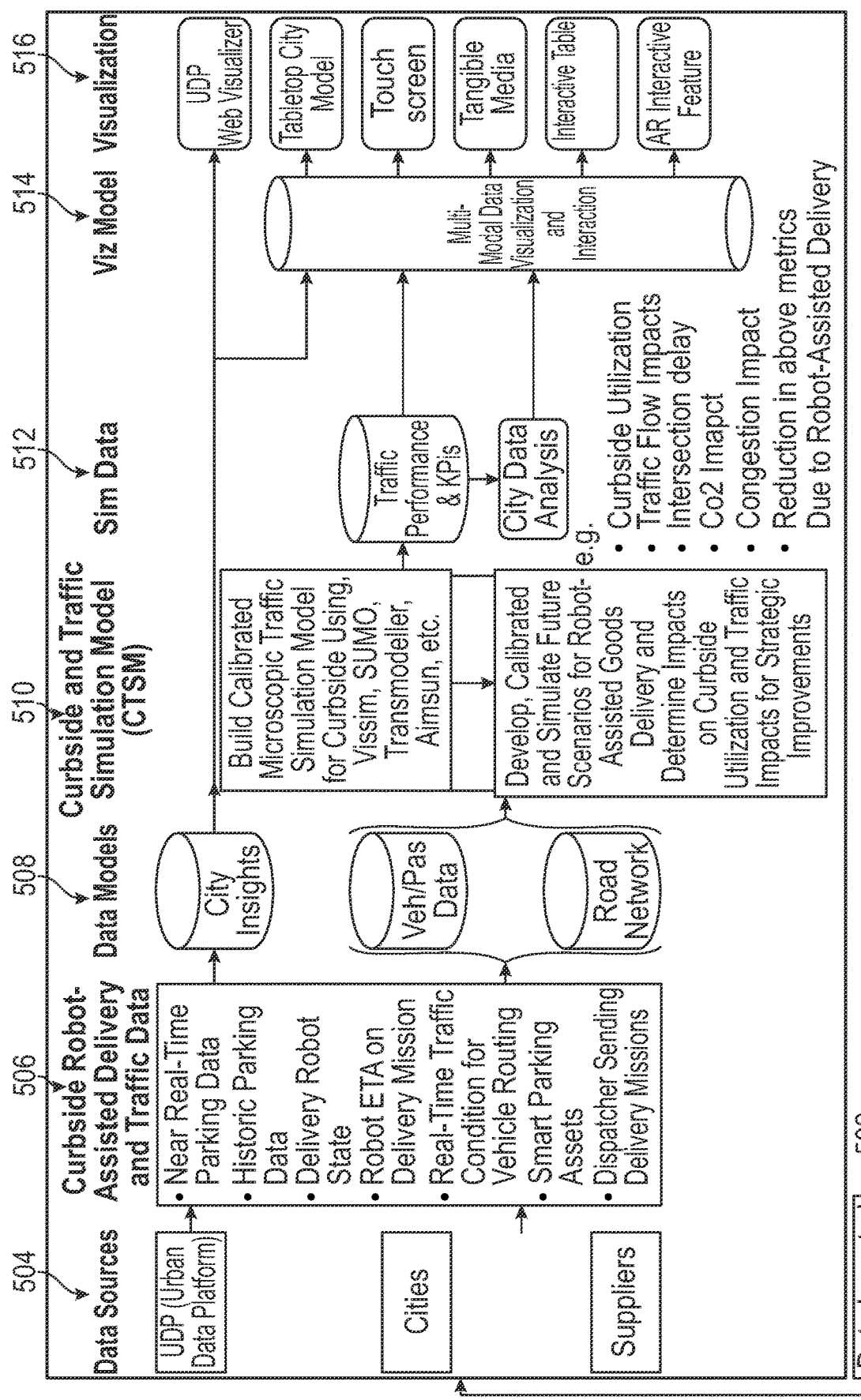
FIG. 5 is a schematic example of a curbside and traffic simulation model creation and utilization method.

FIG. 5 schematically illustrates example CTSM processes, as well as integration with a visualization platform. Data can be ingested from the service provider in a process 502. Additional data sources 504 such as an urban data platform (UDP), cities, and suppliers can also provide data for creating the CTSM. Curbside robot-assisted delivery and traffic data 506 can include, but is not limited to, near-real-time parking data, historic parking data, delivery robot state/status, robot delivery ETA, real-time traffic conditions for delivery vehicle routing, smart parking asset information, and dispatcher sending delivery missions/events. These data are used to create databases and models 508 such as City Insights, Vehicle/Passenger Data, and Road Network. The databases and models 508 are utilized to create CTSMs 510. For example, a CTSM can include a calibrated, microscopic traffic simulation model for the curbside prediction that uses one or more modeling algorithms, which can be used to create calibrated and simulated future scenarios for robot-assisted delivery, as well as determine impacts on curbside utilization and traffic impacts for strategic infrastructure improvements. A CTSM can be used to create simulated data 512 that can include a traffic performance and KPI database, as well as city data analytics that can include curbside utilization, traffic flow impacts, intersection delay, $CO_2$ impact, congestion impacts, and/or a reduction in these impacts due to the use of robot-assisted delivery compared to situations where humans are delivering packages. The city data analytics can be used to create a visualization model 514 that includes a multi-modal data visualization and interaction platform. Various versions of visualizations 516 can be produced that include a UDP web visualizer, a tabletop city model, a touchscreen user interface, tangible media, an interactive table, and/or an augmented reality interactive interface.

In one example use case, the systems and methods disclosed herein can provide coordinated dynamic curb allocation combined with robotic goods and services delivery to alleviate curb demand. Delivery vehicles are configured to both track curbside parking demand, reservation, prediction and utilization to coordinate with optimal release and pick-up of delivery robots in a geofenced area.

With curbside parking utilization info, delivery vehicles can decide on when and/or the duration for parking after delivery robot assignment. This allows efficient urban goods delivery at high-rise buildings by ensuring a temporary drop-off and pick-up at a curbside location reducing the time needed for parking and the consumption of curb space.

Multiple robots can be used for multiple optimal deliveries from one parking location to different destinations in a geofenced area. And for dynamically selected pick-up at a different location once the robots have finished their tasks in order to optimize parking use and efficient pick-up. Simulation and modeling can be created to tailor applications for cities to estimate management choices. Simulation and modeling of these capabilities can be used by businesses to optimize their operations and for cities to visualize the impact of dynamic curb selection on traffic as opposed to existing conditions. These curbside and traffic simulation models (CTSM) can allow cities to improve policies and resources dedicated to addressing the impacts of goods and services deliveries on traffic patterns, infrastructure investment, and other city functions.

Figure 6:
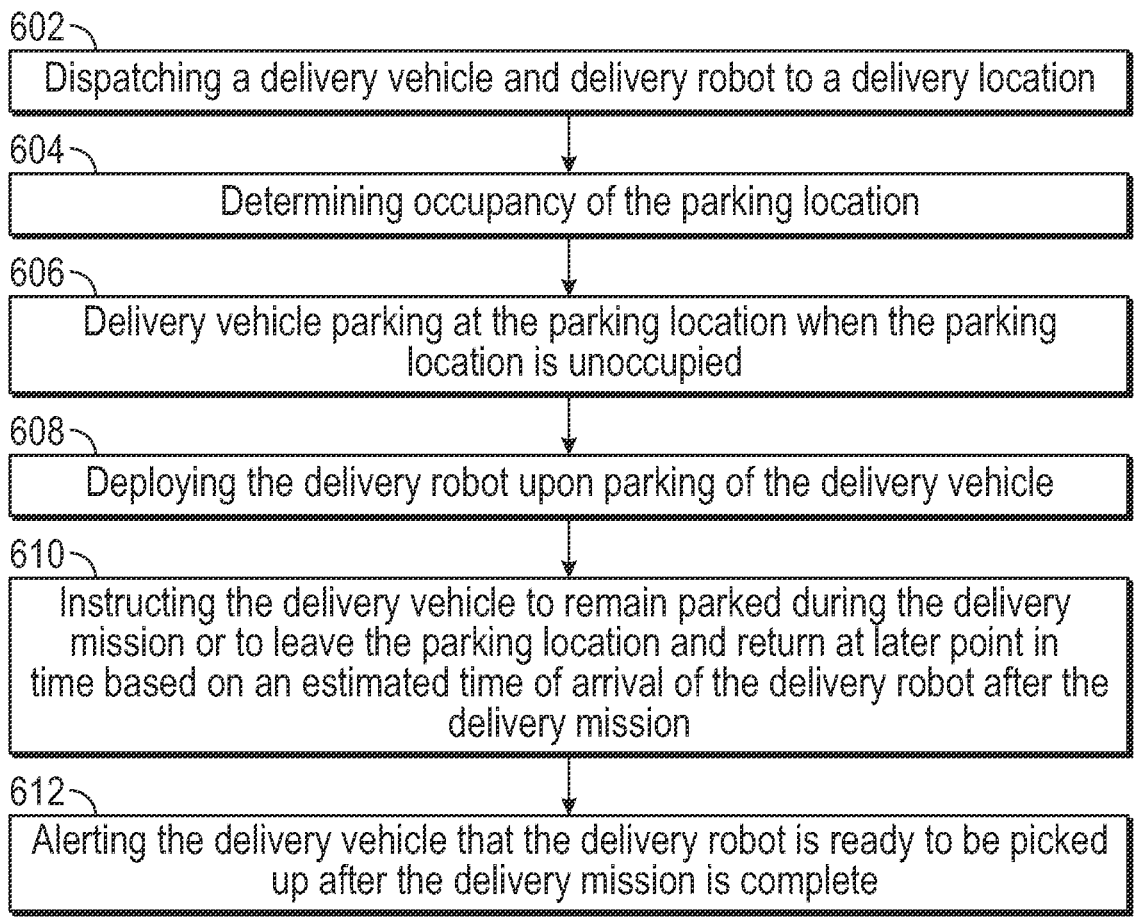
FIG. 6 is a flowchart of an example method of the present disclosure.

FIG. 6 is a flowchart of an example method of the present disclosure. The method can include a step 602 of dispatching a delivery vehicle and delivery robot to a delivery location. It will be understood that the delivery location can include a parking location for the delivery vehicle that allows for the deployment of the delivery robot on a delivery mission. The delivery location and parking location can be defined by a geofenced area. The parking location can comprise a plurality of parking slots, such as a curbside with a plurality of spaces.

The method can include a step 604 of determining occupancy of the parking location. For example, it may be determined whether a parking location is occupied or unoccupied. This determination can be made in real-time using the camera or sensor data from an infrastructure system (e.g., roadside or building), a connected vehicle (delivery or otherwise), and/or a delivery robot. In some instances, the occupancy of the parking location is relayed to the delivery vehicle from a dispatch service, a roadside infrastructure device, and/or a delivery robot. For example, the delivery robot can obtain images of the parking location using an on-board camera. These images can be viewed by a driver of the delivery vehicle to identify that a parking location (or a slot thereof) is unoccupied. These images can also inform the driver that a currently assigned parking location is occupied or may allow a driver to pick and alternate parking location that is currently unoccupied. As noted above, rather than using real-time data, the occupancy of a parking location can be inferred or predicted based on historical usage data. In yet other instances, the occupancy of the parking location is determined from a vehicle sensor platform of the delivery vehicle.

The method can include a step 606 of the delivery vehicle parking at the parking location when the parking location is unoccupied. The method can further include a step 608 of deploying the delivery robot upon parking of the delivery vehicle. Once the vehicle is parked and the robot is deployed, the method can include a step 610 of instructing the delivery vehicle to remain parked during the delivery mission or to leave the parking location and return at a later point in time based on an estimated time of arrival of the delivery robot after the delivery mission. That is, as the robot is deployed, the robot can relay real-time robot status information that can be used to determine when the robot's delivery task will be complete. These data provide a basis for determining an ETA of the robot for returning to the parking location for pickup. Stated otherwise, the method can include determining real-time delivery robot status information of the delivery robot that is used to determine the estimated time of arrival of the delivery robot.

A determination as to whether the vehicle parks or not can be based on thresholds. For example, the delivery vehicle remains parked during the delivery mission when the estimated time of arrival of the delivery robot is less than a threshold amount of time. Alternatively, the delivery vehicle leaves the parking location and returns at a later point in time when the estimated time of arrival of the delivery robot is greater than a threshold amount of time. In some instances, the delivery vehicle can be allowed to double-park when the parking location is occupied, and when a time to deploy the delivery robot is less than a threshold amount of time.

The method can include a step 612 of alerting the delivery vehicle that the delivery robot is ready to be picked up after the delivery mission is complete. This can include, for example, instances where the robot has completed a delivery, regardless of whether the robot has returned to a curbside area or not.

Figure 7:
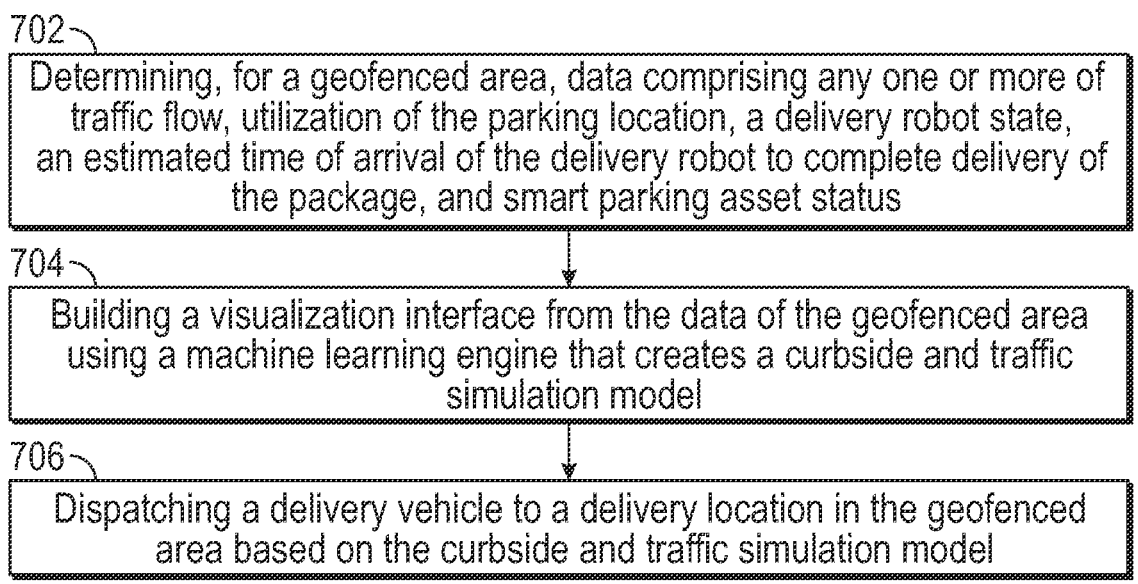
FIG. 7 is a flowchart of another example method of the present disclosure.

FIG. 7 is a flowchart of another method of the present disclosure. The method can include a step 702 of determining, for a geofenced area, data comprising any one or more of traffic flow, utilization of the parking location, a delivery robot state, an estimated time of arrival of the delivery robot to complete delivery of the package, and smart parking asset status. These data can be collected from either or both real-time data and historical data for the geofenced area. The method can also include a step 704 of building a visualization interface from the data of the geofenced area using a machine learning engine that creates a curbside and traffic simulation model. The CTSM can also be used to determine and display one or more key performance indicators.

The method can include a step 706 of dispatching a delivery vehicle to a delivery location in the geofenced area based on the curbside and traffic simulation model. To be sure, the delivery vehicle can park at a parking location of the delivery location, as well as deploy a delivery robot to deliver a package.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   dispatching a delivery vehicle and delivery robot to a delivery location, the delivery location comprising a first parking location for the delivery vehicle that allows for deployment of the delivery robot on a delivery mission;
   determining occupancy of the first parking location, the delivery vehicle parking at the first parking location at a first point in time when the first parking location is unoccupied, the delivery robot being deployed upon parking of the delivery vehicle;
   instructing the delivery vehicle to leave the first parking location, thereby allowing another vehicle to occupy the first parking location after the delivery vehicle leaves the first parking location and while the delivery robot is delivering a package; and
   determining occupancy of a second parking location different than the first parking location, the delivery vehicle or another delivery vehicle parking at the second parking location at a second point in time based on an estimated time of arrival of the delivery robot after the delivery mission, in order to retrieve the delivery robot at the second parking location.

2. The method according to claim 1, wherein the occupancy of the first and second parking locations is relayed to the delivery vehicle from a dispatch service and/or a roadside infrastructure device.

3. The method according to claim 1, wherein the occupancy of the first and second parking locations is determined from a vehicle sensor platform of the delivery vehicle.

4. The method according to claim 1, further comprising determining real-time delivery robot status information of the delivery robot that is used to determine the estimated time of arrival of the delivery robot.

5. The method according to claim 1, further comprising alerting the delivery vehicle that the delivery robot is ready to be picked up after the delivery mission is complete.

6. The method according to claim 1, further comprising instructing the delivery vehicle to double-park when the first parking location is occupied and when a time to deploy the delivery robot is less than a threshold amount of time.

7. The method according to claim 1, further comprising reserving a portion of the first parking location for the delivery vehicle that has been dispatched.

8. The method according to claim 1, further comprising:
   determining a safety status of the delivery robot; and
   triggering an alarm or shutting down the delivery robot when the safety status indicates that the delivery robot has been tampered with or during a delivery robot malfunction.

9. The method according to claim 1, wherein instructing the delivery vehicle to leave the first parking location comprises determining that the estimated time of arrival of the delivery robot is greater than a threshold amount of time.

10. The method according to claim 9, wherein the delivery vehicle parks at the second parking location at the second point in time in order to retrieve the delivery robot at the second parking location instead of the another delivery vehicle.

11. The method according to claim 9, wherein the another delivery vehicle parks at the second parking location at the second point in time in order to retrieve the delivery robot at the second parking location instead of the delivery vehicle that parked at the first parking location.

12. A method, comprising:
  determining, for a geofenced area, data comprising any one or more of traffic flow, utilization of a parking location, a state of a delivery robot, an estimated time of arrival of the delivery robot to complete a delivery mission, and smart parking asset status;
  building a visualization interface from the data of the geo fenced area using a machine learning engine that creates a curbside and traffic simulation model;
  dispatching a delivery vehicle to a delivery location in the geofenced area based on the curbside and traffic simulation model, the delivery vehicle parking at a first parking location of the delivery location at an initial point in time and deploying the delivery robot to deliver a package, the delivery location being defined by the geofenced area;
  instructing the delivery vehicle to leave the first parking location, thereby allowing another vehicle to occupy the first parking location after the delivery vehicle leaves the first parking location and while the delivery robot is delivering a package; and
  dispatching the delivery vehicle or another delivery vehicle to a second parking location in the geofenced area, the second parking location being different than the first parking location, the delivery vehicle or another delivery vehicle parking at the second parking location at a later point in time based on the estimated time of arrival of the delivery robot after the delivery mission, in order to retrieve the delivery robot at the second parking location.

13. The method according to claim 12, wherein the visualization interface includes graphical representations of key performance indicators determined from the curbside and traffic simulation model.

14. A system comprising:
  a processor; and
  a memory for storing instructions, the processor executing the instructions to:
    dispatch a delivery vehicle and delivery robot to a delivery location, the delivery location comprising a first parking location for the delivery vehicle that allows for deployment of the delivery robot on a delivery mission;
    determine an occupancy of the first parking location, the delivery vehicle parking at the first parking location at an initial point in time when the first parking location is unoccupied, the delivery robot being deployed upon parking of the delivery vehicle;
    instruct the delivery vehicle to leave the first parking location, thereby allowing another vehicle to occupy the first parking location after the delivery vehicle leaves the first parking location and while the delivery robot is delivering a package; and
    determine an occupancy of a second parking location different than the first parking location, the delivery vehicle or another delivery vehicle parking at the second parking location at a later point in time based on an estimated time of arrival of the delivery robot after the delivery mission, in order to retrieve the delivery robot at the second parking location.

15. The system according to claim 14, wherein the occupancy of the first and second parking locations is relayed to delivery vehicle from a dispatch service and/or a roadside infrastructure device.

16. The system according to claim 14, wherein the occupancy of the second parking location when the delivery robot has completed the delivery mission is determined from a vehicle sensor platform of the delivery vehicle and a robot sensor platform of the delivery robot when the delivery robot is located at the second parking location.

17. The system according to claim 14, wherein a real-time delivery robot status information of the delivery robot is used to determine the estimated time of arrival of the delivery robot.

18. The system according to claim 14, wherein the processor is configured to transmit an alert to the delivery vehicle when the delivery robot is ready to be picked up after the delivery mission is complete.

* * * * *